United States Patent [19]

Niimura

[11] Patent Number: 5,049,004
[45] Date of Patent: Sep. 17, 1991

[54] UNDERWATER BUILDING AND CONSTRUCTING METHOD THEREOF

[76] Inventor: Masateru Niimura, 6-4-4, Ohmori Mishi, Ohta-ku, Tokyo, Japan

[21] Appl. No.: 467,583

[22] Filed: Jan. 19, 1990

[30] Foreign Application Priority Data

Jan. 20, 1989 [JP] Japan .................................. 1-10004

[51] Int. Cl.⁵ ........................ E02B 17/00; B63B 35/44
[52] U.S. Cl. .................................. 405/204; 405/194; 405/195
[58] Field of Search ............... 405/194, 195, 204, 206, 405/207, 210, 205

[56] References Cited

U.S. PATENT DOCUMENTS

| | | | |
|---|---|---|---|
| 873,581 | 12/1907 | McQueen | 405/204 X |
| 875,699 | 1/1908 | Dumais | 405/204 |
| 2,050,727 | 8/1936 | Misz | 405/206 |
| 2,051,926 | 8/1936 | Weiner | 405/194 |
| 2,940,266 | 6/1960 | Smith | 405/204 |
| 3,091,089 | 5/1963 | Gellerstad | 405/206 |
| 3,145,539 | 8/1964 | Estes et al. | 405/210 |
| 3,464,212 | 9/1969 | Yamagata et al. | 405/204 |
| 3,708,991 | 1/1973 | Barkley | 405/194 |
| 4,155,671 | 5/1979 | Vos | 405/210 X |
| 4,186,532 | 2/1980 | Kahn | 405/194 X |
| 4,314,776 | 2/1982 | Palmer et al. | 405/205 |
| 4,425,055 | 1/1984 | Tiedemann | 405/204 X |
| 4,674,916 | 6/1987 | Dziewolski | 405/207 |

*Primary Examiner*—Dennis L. Taylor
*Attorney, Agent, or Firm*—Lowe, Price, Leblanc and Becker

[57] ABSTRACT

An underwater building comprises a floating base that is to be fixed to a bottom under water or the sea and a building body is constructed on the base. The base floats on the water surface before construction of the body of the building, and the building body formed thereon has a double-walled construction having an opening between an outside wall and an inside wall. Water is selectively poured into and drained from the opening, and by its weight the building body is controllably sunk into the water. Only a gateway tower portion made in the upper portion of the building body is eventually left projecting out of the water.

17 Claims, 7 Drawing Sheets

UNDERWATER BUILDING AND CONSTRUCTING METHOD THEREOF

FIELD OF THE INVENTION

This invention relates to large scale underwater building structures and a method for constructing the same.

BACKGROUND OF THE INVENTION

Due to the large populations concentrated in many cities recently, it is difficult to obtain land. It is known that to utilize the land effectively it is probably advantageous to construct large scale buildings such as warehouses or garages, where human beings do not live, undersea or underwater.

According to conventional methods of constructing an underwater building, e.g., in constructing a large scale building such as a warehouse or a garage, after the building is constructed on the land it is carried by ship to a selected location and there sunk in the water. However, there is a problem in that the size of such a building is limited to one that can be carried by ship, and it takes a long time to set it up. Also, such a completed building can be transported only in calm weather and it is very difficult to sink a large building correctly since it must be set underwater horizontally. Also, it takes a long time and incurs high costs since a stable base must first be made underwater for the building.

Another known construction method requires setting up of boards underwater in a selected area to construct an underwater building, or dividing the area by piling stones. Thereafter, the inside water is drained, and an underwater building is constructed much as a building is constructed on land. By this method, the size of an underwater building is not limited and the underwater building can be constructed without concerns about the effect of water during the construction period. However, there is a problem in that the useful site is limited to a shallow place and it takes a long time and costs much to wall off the selected area, to drain the inside water, and to keep the construction situations the same as that on land.

SUMMARY OF THE INVENTION

Accordingly, it is an object of the present invention to provide an underwater building and a method for the construction thereof in which a separate base construction on the ground is not needed as for a building that is constructed on the land, construction does not take a long time and costs are reduced substantially, and security after construction is guaranteed. Also, such a building can be used for various purposes.

According to the invention, an underwater building comprises a base that is eventually to be fixed at the bottom of the water or the sea, and a building body to be constructed on the base. The "base," in effect, is at about the water surface before construction of walls of the building body thereon. The building body has a double construction, having an opening between an outside wall and an inside wall, and water is poured into and drained from the opening. Alternatively, by a prepared weight the building body is sunk in the water. Only a gateway tower portion made in the upper portion of the building body is kept out of the water.

According to the invention, in a situation in which the base has buoyancy and is floated on the water, or after it is carried to a chosen place to construct an underwater building thereon, the base is temporarily fixed to underwater anchors. After an outside wall of the building body is formed on the base, an inside wall is formed inside of the outside wall. The outside wall and the inside wall are extended upwards, the partially formed building body is sunk into the water slowly by water poured between the outside wall and the inside wall or by a weight in the event that the weight of the water pumped in for sinking is not enough. The base and the building body are thus constructed and sunk in the water so that, when the building is completed, the base is fixed at the bottom of the water and only a gateway tower portion made in the upper portion of the building body is out of the water.

Particularly important points in the forming of an underwater building according to this invention include the following.

The first is that forces experienced by the building body underwater due to wave pressure or wind pressure are always the same as those experienced by the gateway tower portion out of the water. The underwater building of the invention, accordingly, remains fixed underwater securely even in a storm.

The second important feature is that the building is only a little heavier than the water that it displaces and is lighter than the resistance pressure of the ground at the bottom of the water, hence the building can be fixed even on a relatively soft bottom under the water. The building can accordingly be prevented from sinking into the ground beneath the water, and any force required for fixing the building can be adjusted. Further, should an earthquake happen, transmission of vibration to the building can be intercepted effectively together with the above surface pressure effect.

A third important feature of this invention is that the underwater building has a double-walled construction due to the outside wall and the inside wall and, accordingly, waterproof treatment of the outside wall underwater is not needed to be done very strictly. Hence, even if waterproofing of the outside wall underwater is not enough, and the water leaks in from the outside wall, or the humidity becomes high, flooding can be effectively prevented in the zone inside of the inside wall by only small water removing and draining equipment and air conditioning equipment. Accordingly, costs can be reduced substantially, and the weight of the underwater building can be adjusted at will by pouring in or draining out the water between the outside wall and the inside wall. Adjusting of the building weight can be also done by other means, for example, by a prepared weight or by a pulling and extending operation on an anchor.

Yet another important feature of this invention is that it is possible to construct the underwater building at the place where it is to be permanently located. Accordingly, it is not necessary to transport the completed building, and the overall cost can be reduced substantially.

BRIEF DESCRIPTION OF THE DRAWINGS

The invention will be explained in more detail in conjunction with the appended drawings, wherein.

DESCRIPTION OF THE PREFERRED EMBODIMENT

Figure 1:
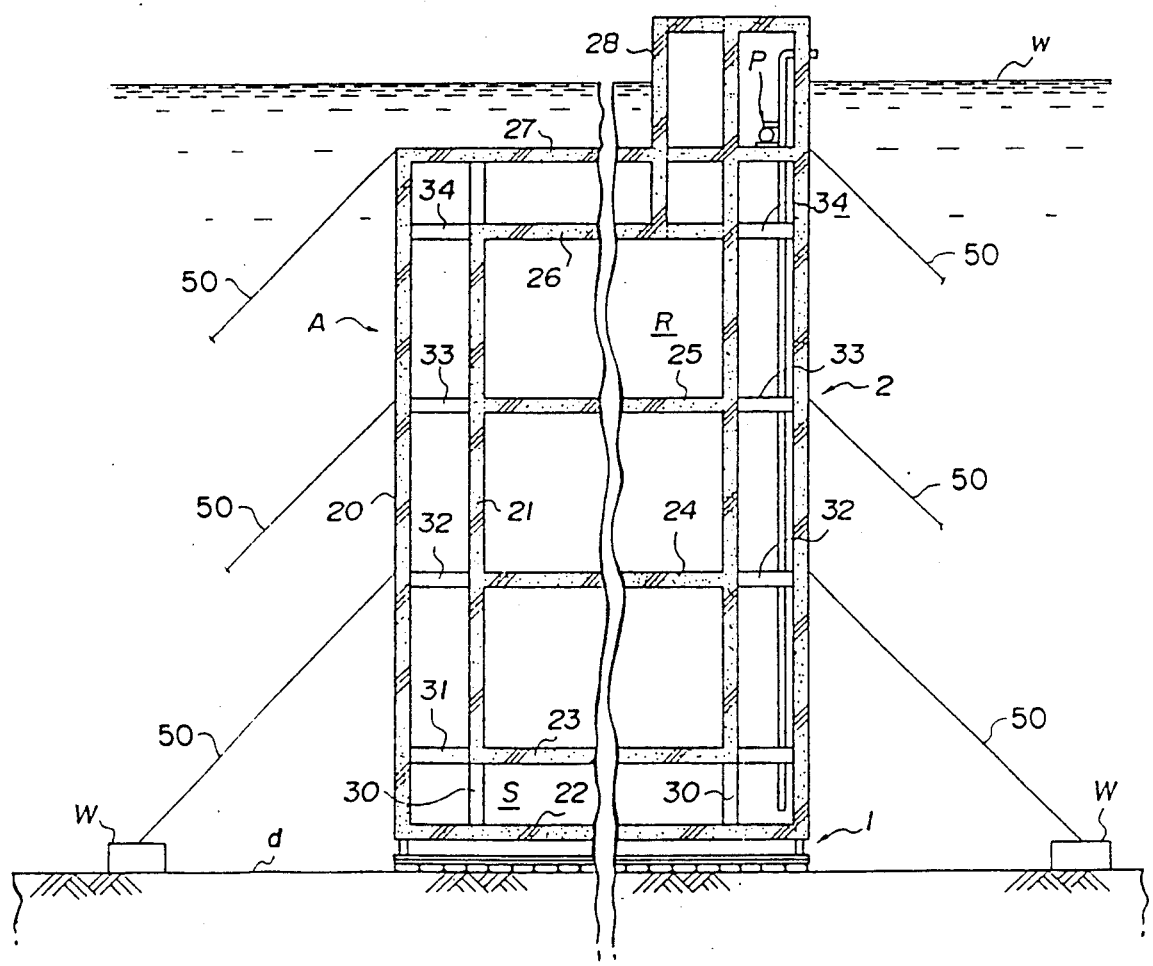
FIG. 1 is a vertical sectional view of an underwater building according to a preferred embodiment of the invention.

As shown in FIG. 1, an underwater building "A" according to a preferred embodiment of this invention comprises a base 1, made of steel or the like, and a building 2 constructed on the base 1.

Figure 2:
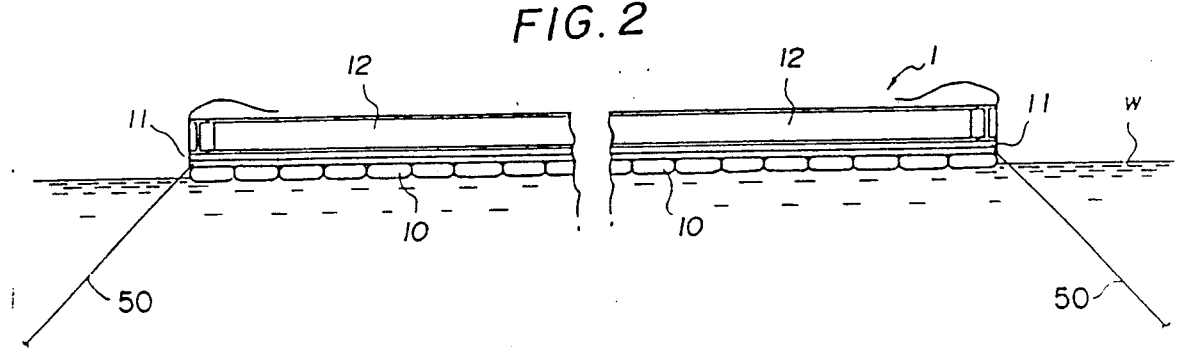
FIG. 2 is a magnified front elevation view of a floating base.
Figure 3:
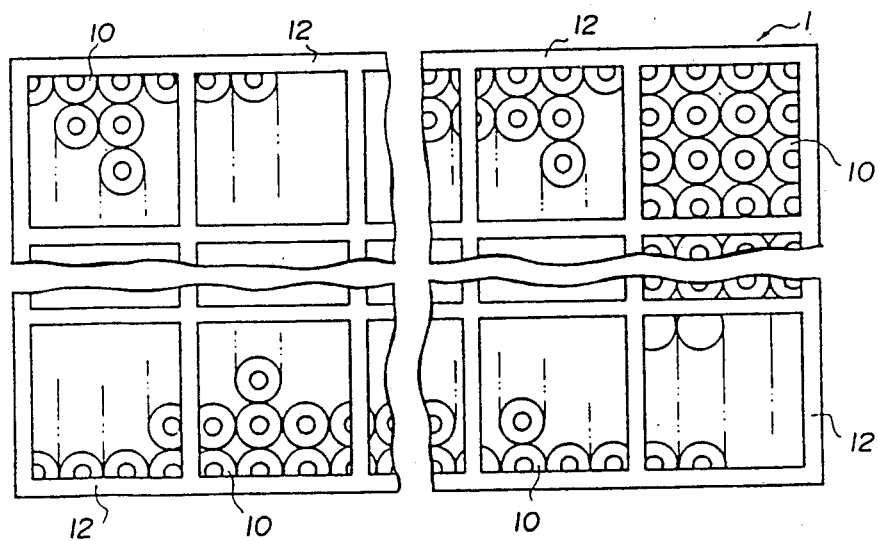
FIG. 3 is a magnified plan view of the base per FIG. 2.

Base 1 comprises, as shown in FIGS. 2 and FIG. 3, a number of floats 10, made of tire tubes or the like, a connecting frame 11 set on the upper side of the float 10 to connect thereto, and a holding frame 12 set inside the upper side of the connecting flame 11. Large buoyancy can be obtained by appropriate selection of the number of floats 10.

Styrofoam or the like can be substituted for the tire tubes in forming the floats 10 to obtain a large buoyancy.

The base 1 is formed as large as necessary to obtain the desired buoyancy as described above. The base 1 can be floated on the water "w", and does not sink in the water even after material for constructing the building body 2 on the base 1 is loaded thereon and first floor and outside walls of the building body 2 constructed thereon.

The base 1 constructed as above is transported to the selected position for constructing the underwater building by a tug, or is constructed at the selected position. At the selected position, while the base 1 is floating on the water surface "w", it is conveniently connected by cables to one or more anchors "W" set at the bottom "d" of the water and fixed so as to not be carried away by water current. See FIG. 2.

Figure 4:
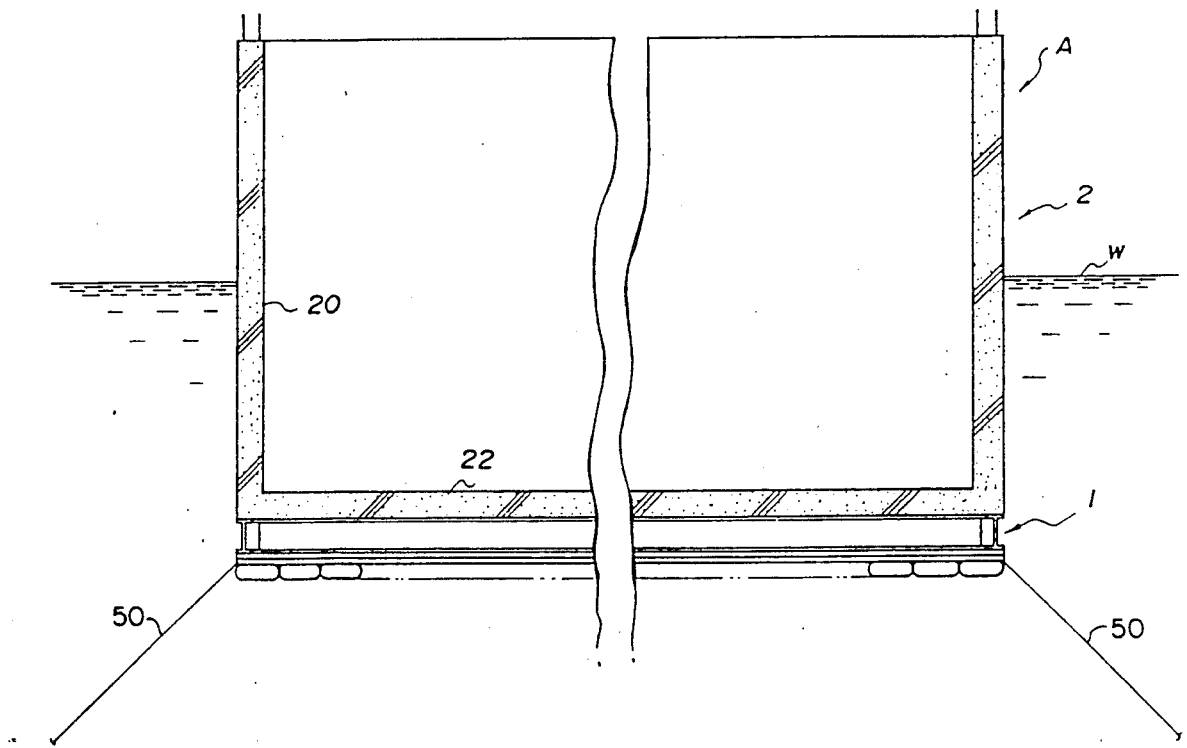
FIG. 4, FIG. 5, and FIG. 6 are magnified vertical section views illustrating successive stages in the process of constructing a building body on the base according to this invention.
Figure 5:
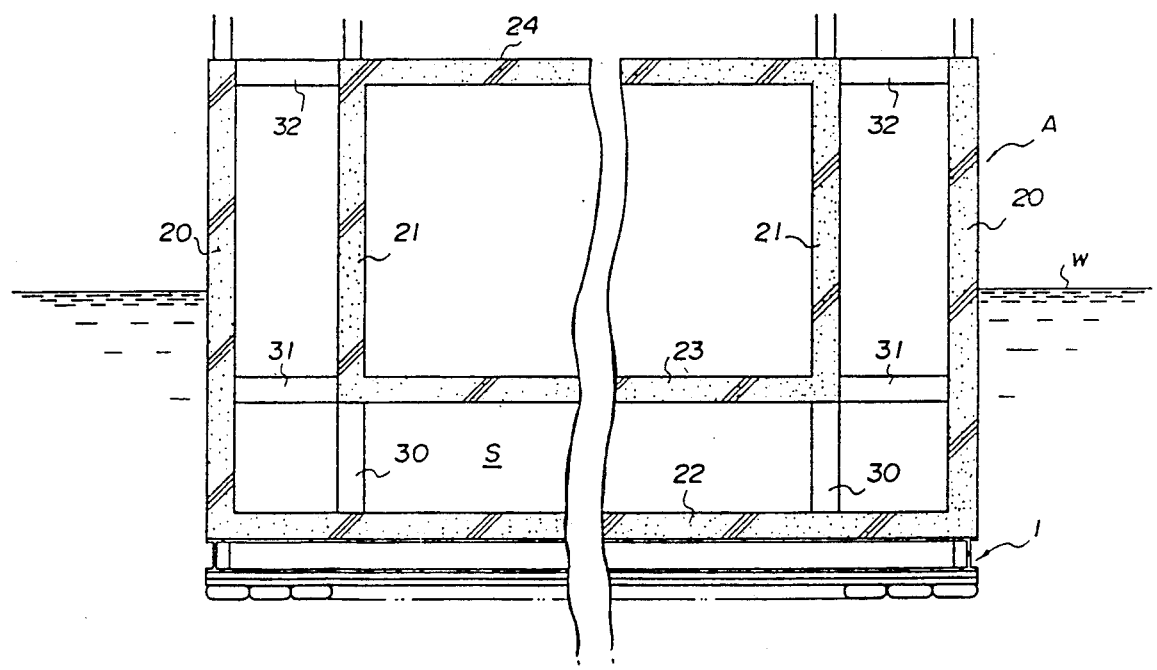
Figure 6:
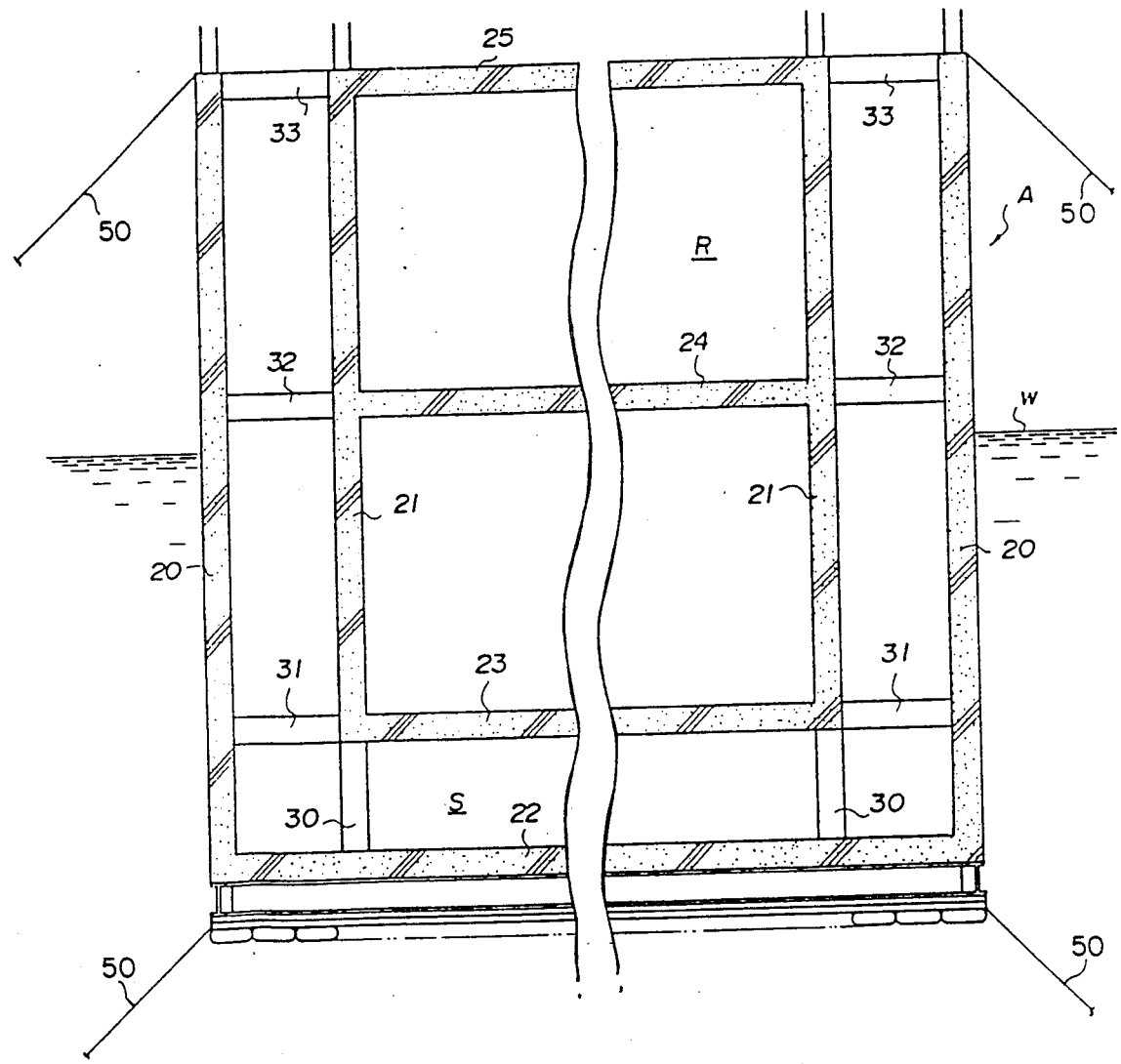

The building body 2 is to be constructed on the base 1. As shown in FIGS. 4, 5, and 6, the building body 2 comprises an outside wall 20 and an inside wall 21. Further, in this preferred embodiment, there are provided, for example, a base floor 22, a first floor 23, a second floor 24, a third floor 25, a ceiling floor 26, a top floor 27, and a gateway tower portion 28.

The base floor 22 is constructed first on the base 1. Thereafter, the outside wall 20 only for the first floor is formed on the base floor 22. See FIG. 4.

A structure rather like a pool, concave in lengthwise sectional view, is thus made on the base 1 thereby. Further construction, namely the construction of the inside wall 21 inside of the outside wall 20, can thereafter be done without workers suffering the effect of the wind or the water outside.

After the outside wall 20 is formed as above, the inside wall 21, also concave in a lengthwise sectional view, is constructed inside of the outside wall 20 and, at the same time, the first floor 23 is formed at the bottom portion of the inside wall 21. A pillar 30 is erected between the first floor 23 and the base floor 22 thereunder for this, and a beam 31 is then made outwardly of the first floor 23 to connect to an inside surface of wall 20, as best seen in FIG. 5.

A space "S" in which the water is poured is thus formed between the first floor 23 and the base floor 22, and between the outside wall 20 and the inside wall 21. See FIGS. 1 and 6.

After the inside wall 21 is constructed as above, the second floor 24 is made at the top portion of the inside wall 21, a beam 32 is made outward of the second floor 24, the inside wall 21 is extended on the second floor 24, and the outside wall is further extended on the top of the outside wall 20. See FIG. 5.

The outside wall 20 is extended on the top position thereof as above, the third floor 25 is made at the top of the inside wall 21, and a beam 33 is made outward of the third floor 25. By repetition of the above operation, the ceiling floor 26, the top floor 27, the gateway tower portion 28, and a beam 34 are made to complete the building body 2. Additional floors may be formed similarly if desired.

In the invention, the outside wall 20 and the inside wall 21 are preferably made of water-resistant and pressure-resistant material such as reinforced concrete or the like to ensure watertightness of the submerged portions of the building "A". See FIG. 7.

Thus, in the building body 2 constructed according to this invention, the outermost surfaces of the finished underwater building are provided by the outside wall 20, the base floor 22, the top floor 27, and the gateway tower portion 28. The inside wall of the underwater building is provided by the inside wall 21, the floors 23-25, and the ceiling floor 26, and the inside thereof is an indoor region "R." See FIG. 6.

The inside region R of the underwater building constructed according to this invention as described above can be utilized, for example, as a warehouse or a garage and in this case, an elevator can be provided in known manner inside it.

The water can be poured and drained in and from an opening to space "S" by a pump conveniently located in the gateway tower portion 28, and the weight of the building body 2 may be increased thereby to fix the building body 2 securely to the bottom "d" under the water.

At this time, a hydrostatic surface pressure "a" acting on the building body 2 at portions under the water surface "w" is larger than the surface pressure "b" acting on the gateway tower portion 28 that is projecting out of the water (i.e., a>b). Accordingly, the underwater building "A" can be fixed underwater securely, even in a storm. The surface pressure "a" acting on the building body 2 is due to water pressure and any currents acting on the outside wall of the building body 2 underwater, and the surface pressure "b" to the gateway tower portion 28 is likely to be due to wind pressure and wave pressure.

Figure 7:
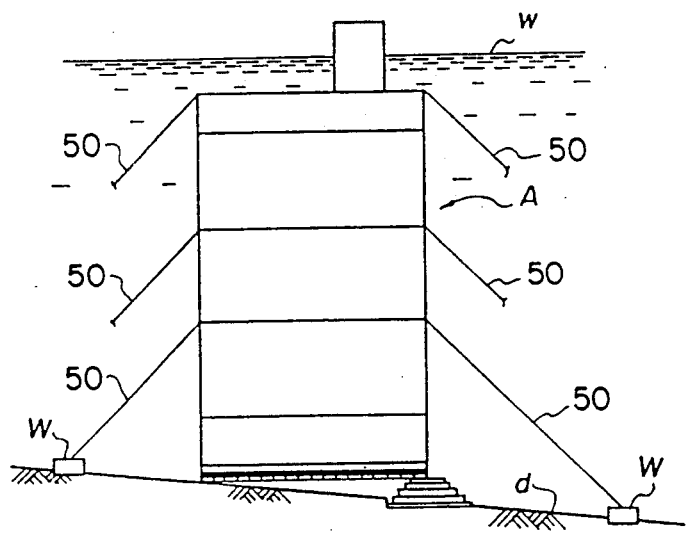
FIG. 7 is a schematic view of an underwater building in its located state in a second preferred embodiment of the invention.

In the above-described preferred embodiment, the underwater building "A" can be utilized as a warehouse or a garage. It can also be used as a breakwater or a block to protect against waves. The setting thereof is therefore not limited to only a level bottom, but can be on an inclined bottom "d" of the water as well, as shown in FIG. 7.

Figure 8:
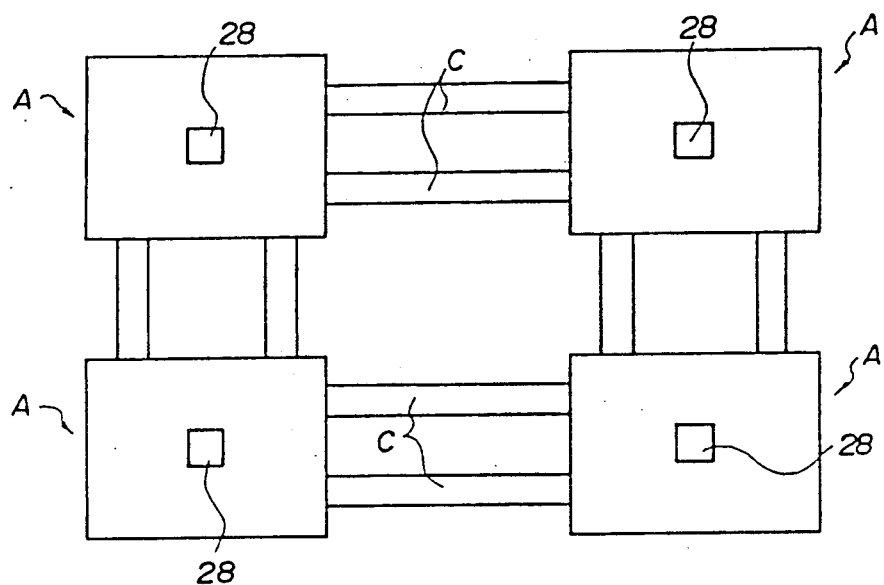
FIG. 8 is a plan schematic view of an arrangement of the underwater building in the second preferred embodiment of the invention.
Figure 9:
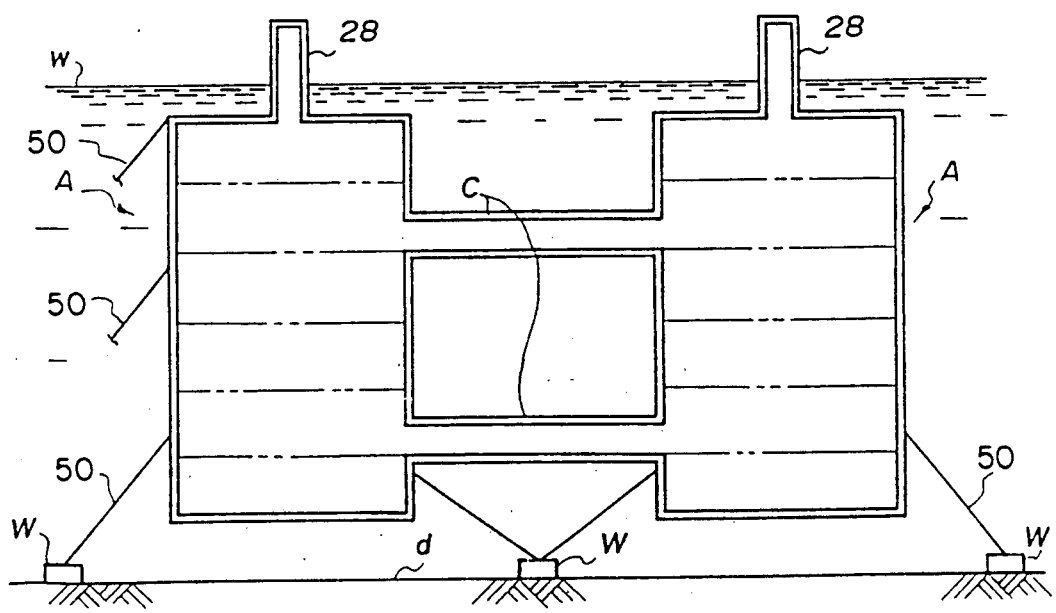
FIG. 9 is a sectional schematic view illustrating a manner of fixing of the underwater building in place, according to this invention.

FIGS. 8 and 9 show a second preferred embodiment of the invention, wherein four underwater buildings "A", per the first preferred embodiment, are constructed and each underwater building A is connected to the adjacent buildings by connecting passages "C," so that people and objects can go thereto and therefrom. Other aspects of the construction and operation are the same as those in the first preferred embodiment. Accordingly, the same features are identified by the same numerals and a detailed explanation thereof is omitted. The number of such underwater buildings "A" connected by connecting passages is not limited to the above number, but more than two underwater buildings "A" can be connected as described and illustrated in FIGS. 8 and 9.

In the invention described as above, by a novel method different from the conventional method in which a known type of base construction is needed, an underwater building can be completed in a short period in a process similar to that employed in constructing a building on the land. Note that only materials have to be transported to the selected site without carrying large elements by ship, and accordingly, costs therefor can be reduced substantially. Construction can be done on the water without workers suffering the effects of the water, e.g., waves or wetness, and accordingly, construction is simple and safe.

In a building according to the invention, the surface pressure acting on the building body portion underwater is larger than that on the gateway tower portion that projects out of the water, and accordingly, stability after construction can be guaranteed, and the inside of the underwater building can be used for various purposes.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A building constructed to be located substantially underwater, comprising:
    a controllably floatable base; and
    a multi-floor building structure, comprising a plurality of sequentially constructed floors and outer wall constructed with the lowest floor of the building formed on the base while said base is floating, with additional floors built sequentially thereon as said base is controllably submerged in water,
    wherein said building is formed to have an enclosed space adjacent the base, said enclosed space being fillable with water to controllably adjust a corresponding flotation of the base and floors of the building being constructed thereon, said building further comprising an entrance tower located at the uppermost floor at a predetermined height selected such that entry is provided to a user of the building at an entrance located in the entrance tower above an ambient water surface level when the base with the building built thereon is finally sunk to rest at a desired location in the water.

2. A building according to claim 1, wherein:
    said floatable base comprises a first frame of selected shape and size and having an open top, and is floatably supported by a plurality of flotation elements disposed thereunder.

3. A building according to claim 2, further comprising:
    at least one holding frame located within said open top of said first frame.

4. A building according to claim 2, wherein:
    said flotation elements comprise tire inner tubes.

5. A building according to claim 2, wherein:
    said flotation elements comprise styrofoam.

6. A building according to claim 1, further comprising:
    a plurality of cables for adjustable anchoring of said base at a selected location before, during and after construction of elements of said building thereon.

7. A building according to claim 1, further comprising:
    means for selectively providing water into said enclosed space and for drawing water therefrom, to thereby control an extent to which said base with said building constructed thereon is controllably caused to submerge below an ambient water level.

8. A building according to claim 1, further comprising:
    means to facilitate transport of persons and objects from an entrance of said entrance tower above an ambient water level to portions of said building that are submerged.

9. A building according to claim 1, wherein:
    said building when finished has an outside wall extending upwardly of said base and having an outer surface exposed to water within which said building is submerged;
    an inner wall within said outside wall, defining an inside region; and
    means for bracing said inside wall to said outside wall.

10. A building according to claim 1, further comprising:
    at least one other building similarly constructed, with passage means disposed between said building and said other building below an ambient water level for enabling movement of people and objects therebetween.

11. A method for constructing a building that is to be finally located substantially underwater, comprising the steps of:
    forming a floatable base;
    floating and towing the floatable base to a location where said building is to be completely constructed to be located to rest on an underwater surface;
    constructing the lowest floor of the building and an enclosed water-fillable space on the floating base, and sequentially constructing a predetermined number of additional floors and outer wall thereon as said floatable base is correspondingly submerged; and
    at the uppermost floor of the building providing an entrance tower structure with an entrance at a predetermined height such as to enable access to the building therethrough above an ambient water surface level following sinking of the base with the building built thereon being disposed substantially under water at said location.

12. A method for constructing a building according to claim 11, comprising the further step of:
    selectively providing water into or draining water from said enclosed water-fillable space after said base is floated to said location, to thereby control the extent to which said base and building being constructed thereon are caused to submerge below said ambient water surface level.

13. A method for constructing a building according to claim 11, comprising the further step of:
- forming an outside wall on the floatable base to provide for each sequentially built floor an outer surface of the building in contact with ambient water when submerged;
- forming an inside wall within and corresponding with said outside wall, to define a useful inside region therein; and
- forming bracing beams bracing the inside wall to the outside wall.

14. A method for constructing a building according to claim 11, comprising the further step of:
- anchoring said base to a selected fixed point at the location where said building is to be substantially submerged upon completion.

15. A method for constructing a building according to claim 11, comprising the further step of:
- providing transportation from an entrance to lower locations within said building.

16. A method for constructing a building according to claim 11, comprising the further step of:
- constructing a plurality of similar buildings; and
- providing passages between adjacent ones of said buildings to enable movement of people and objects therebetween at locations below said ambient water surface level.

17. A method for constructing a building according to claim 11, comprising the further step of:
- firmly affixing said building in its submerged state to an underwater surface so as to dispose said base in a level manner.

* * * * *